Patented Feb. 11, 1930

1,746,782

UNITED STATES PATENT OFFICE

WILBUR A. LAZIER, OF WILMINGTON, DELAWARE, ASSIGNOR TO E. I. DU PONT DE NEMOURS & COMPANY, OF WILMINGTON, DELAWARE, A CORPORATION OF DELAWARE

CATALYST AND CATALYTIC PROCESS

No Drawing. Application filed June 12, 1926. Serial No. 115,692.

This invention relates to catalysts and catalytic processes and it comprises, more particularly, highly efficient chromite catalysts, such catalysts being prepared by the high temperature treatment of mixtures or compounds containing hexavalent chromium to form chromites containing trivalent chromium.

Numerous mixtures and combinations containing oxides of chromium and other metals have been made and used as catalysts in various processes. Such mixtures have been prepared in many different ways, such as by the co-precipitation of the hydroxides or carbonates of chromium and the other metals, by treating a metallic oxide with chromium trioxide in the wet way or by preparing fused masses consisting of alkali bichromates and the metallic oxides. In some cases metallic chromates have been used directly as catalysts. However, the catalysts have been prepared at temperatures below about 600° C., since it has been found, in the past, that heating the usual oxide catalysts to high temperatures destroys the activity of the catalysts.

According to the present invention, it has been found that valuable catalysts containing chromium oxide in the trivalent form may be prepared at high temperatures and these catalysts are much more efficient than such catalysts as have been prepared and used heretofore. For example, by calcining suitable chromates at temperatures from about 650° C. to 1000° C. the chromates are reduced to chromites with the liberation of oxygen. The chromite catalytic bodies thus derived show great superiority in catalytic activity as compared with that of similar catalysts prepared, for example, by the reduction of the chromates by heating in hydrogen at temperatures below 600° C. These improved results were entirely unexpected since prior knowledge has indicated that the activity of a catalyst is generally destroyed by heating to high temperatures.

In addition, it has been found that the activity of the chromite catalysts, prepared according to the present process, may be improved still further if the calcined product is treated to remove the less active substances present in such product, which substances are not combined in the form of chromite and are of low catalytic activity. The undesirable substances may be removed in any suitable way, such as by leaching the calcined product with a weak acid, e. g., acetic acid in concentrations of about 5-10%. The chromites made as described are stable and are substantially insoluble in water and in weak acids. The preparation of the catalysts, according to the present process, results in the formation of catalytic bodies of great porosity, which, after drying, consist of nearly pure, highly stable chromites substantially free from acid soluble oxides or other substances of low catalytic activity. These chromite catalysts are highly stable and do not lose their activity after use in a catalytic process. For instance, zinc chromite, which has been prepared as just described and was leached with acid prior to its use as a catalyst, is found to contain no additional acid soluble zinc after using the zinc chromite as a catalyst. The present catalysts have the further advantage that they are not affected by use at high temperatures.

As has been pointed out, the active catalysts forming the subject of the present invention are chromite compounds containing chromium in the trivalent form. However, the term chromite, as here used, does not necessarily refer to a compound of definite chemical composition since the chromites may contain widely differing proportions of its components. Zinc chromites, for example, are known to contain a varying proportion of zinc oxide, and this proportion is dependent on the ratio of zinc to chromium in the compound or mixture of compounds calcined and upon the temperature and duration of the calcination. In any event, the chromites contain the chromium in trivalent form.

The chromite catalysts may be prepared by many varied methods in which a compound or mixture in which the chromium present is in the hexavalent form is reduced at high temperatures to a compound containing the chromium in trivalent form. The following are some of the general methods of preparing a catalyst according to the present invention: (1) prolonged heating at a red heat of mixtures of metallic chlorides or other metallic salts with alkali chromates or bichromates, the resulting product being leached with water and dilute acids; (2) using in place of the salts described in (1) the oxides of the metals; (3) igniting a metallic chromate and treating the ignited product with acid to remove the excess of metallic oxide not combined with the chromium oxide; (4) ignition at a red heat of double chromates such as double salts of metallic chromates with ammonium chromate or bichromate. Other suitable methods which involve the high temperature reduction of chromates to chromites may be used.

The preparation of catalysts according to method (4) is particularly useful. Taking the preparation of zinc chromite as a typical example, a contact mass of excellent activity for methanol synthesis may be prepared by precipitating basic zinc ammonium chromate from solutions of soluble zinc salts and ammonium chromate. This precipitated compound is washed and dried, and when heated slightly to start the reaction, decomposes spontaneously with the evolution of sufficient heat to leave a glowing residue consisting of combined zinc oxide and chromium sesquioxide. That the greater part of the zinc oxide is combined with the chromium oxide is evidenced by the fact that only about one-third of the zinc oxide may be extracted by five percent acetic acid. Compounds of organic bases may be utilized in place of ammonium salts; for example, zinc bichromate tetrapyridine and zinc bichromate tetra-aniline are crystalline salts which, when heated, behave in an analogous manner and yield zinc chromites useful as catalysts.

The present catalysts contain chromium sesquioxide combined with oxides of other elements, i. e., as the chromites, and are suitable for general use in all of the catalytic processes in which chromium oxide mixed with other oxides is used as the catalyst. For instance, the chromite catalysts are suitable for use in the high pressure synthesis of oxygenated organic compounds such as methanol and alcohols of higher molecular weight from mixtures of hydrogen and oxides of carbon. The chromite catalysts may also be used for the water gas reaction wherein carbon monoxide and water vapor are converted catalytically to carbon dioxide and hydrogen; or the catalysts may be used for dehydrogenations such as the catalytic conversion of an alcohol to an aldehyde.

Many various elements may be combined with trivalent chromium oxide to form chromites which are suitable for use as catalysts. Zinc has already been mentioned as one of the basic elements, which, combined with chromium oxide to form zinc chromite, is an extremely valuable catalyst particularly when used for the methanol synthesis. In place of zinc any one of that group of elements, which, either in the form of the finely divided metals or in the form of the oxides, constitute active catalysts for the methanol synthesis, or for other reactions, may be combined with chromium oxide to form the corresponding chromite. Included in this group of metals, which will hereafter be designated as the "catalytic group", are zinc, copper, cadmium, magnesium, manganese, silver and iron.

In the various embodiments of the present invention, including the various methods of preparing chromite catalytic bodies, any one of this "catalytic group" of metals may be used as the more basic element to form the chromite; or, if desired, several of these metals may be used to form mixtures of the desired chromites.

In order to describe the invention more fully the following specific examples are given, it being understood that the present invention is not limited to these specific illustrations.

*Example 1.*—A contact mass is prepared by heating basic zinc chromate containing 42.5 percent by weight zinc and 25 percent chromium for four hours in air at a temperature of 800–900° C., after which the product is cooled and extracted with 10% acetic acid until no more zinc may be removed. This product is then washed and dried. The resulting product contains about 35% zinc and 39% chromium which, when calculated as ZnO and $Cr_2O_3$, equals 100%. One liter of such a catalyst when placed in a pressure resisting copper lined tube yields 950 cc. of crude condensate containing about 80% of methanol per hour at about 400° and about 300 atm. pressure from a gas consisting of about 30% carbon monoxide and about 60% hydrogen, when the gas mixture is passed through the catalyst at the rate of about 10,000 liters per hour as measured at normal temperature and pressure. As illustrating the improvement resulting from application of the above process, the basic zinc chromate before heating and extracting with acid produces only 750 cc. of crude condensate per hour under the same conditions.

*Example 2.*—Basic zinc ammonium chromate is prepared by cold precipitation as the result of mixing solutions containing molecular equivalents of zinc nitrate and ammonium chromate. When heated slightly to start the reaction, this basic salt decomposes spontaneously with the evolution of sufficient heat to leave a glowing residue. When used as a contact mass as in Example 1 but without extraction with acids this product yields per liter of catalyst, 1300 cc. of crude condensate containing about 90% methanol.

*Example 3.*—Zinc bichromate tetrapyridine is prepared by the addition of pyridine in excess to a boiling solution of zinc bichromate, when the pyridine salt crystalizes out. When heated slightly to start the reaction, the pyridine salt decomposed spontaneously with the evolution of heat leaving zinc chromite as a glowing mass. Without extraction this product yields 900 cc. per hour of crude condensate containing about 90% pure methanol per liter of catalyst.

*Example 4.*—Manganese ammonium chromate is prepared by precipitation as the result of mixing solutions containing molecular equivalents of manganese nitrate and ammonium chromate. This double salt is heated to its decomposition point and a residue is obtained which when used in the manner described in Example 1 produces 800 cc. of crude condensate per hour, containing about 50% methanol and 25% of alcohols of higher molecular weight.

I claim:

1. In the process of carrying out an organic catalytic hydrogenation reaction by passing a reactive gas mixture at elevated temperature and pressure over a catalyst, the step which comprises using as the catalyst a chromite prepared by calcining at a red heat a hexavalent chromium salt containing a hydrogenating metal.

2. In the process of synthesizing oxygenated organic compounds by passing a mixture of hydrogen with an oxide of carbon at elevated temperature and pressure over a catalyst, the step which comprises using as the catalyst a chromite prepared by calcining at a red heat a hexavalent chromium salt containing a hydrogenating metal.

3. In the process of synthesizing oxygenated organic compounds by passing a mixture of hydrogen with carbon monoxide at elevated temperature and pressure over a catalyst, the step which comprises using as the catalyst a chromite prepared by calcining at a red heat a hexavalent chromium salt containing a hydrogenating metal.

4. In the process of carrying out an organic catalytic hydrogenation reaction by passing a reactive gas mixture at elevated temperature and pressure over a catalyst, the step which comprises using as the catalyst a chromite prepared by calcining at a red heat a composition containing hexavalent chromium and a compound of a hydrogenating metal.

5. In a catalytic process of forming organic compounds in a three-component reaction system comprising an oxygen-containing carbon compound capable of hydrogenation, an oxygen-containing carbon compound capable of dehydrogenation, and hydrogen, the step which comprises using as the catalyst a chromite prepared by calcining at a red heat a hexavalent chromium salt containing a hydrogenating metal.

6. In a catalytic process of forming organic compounds in a three-component reaction system comprising an oxygen-containing carbon compound capable of hydrogenation, an oxygen-containing carbon compound capable of dehydrogenation, and hydrogen, the step which comprises using as the catalyst a chromite prepared by calcining at a red heat a hexavalent chromium salt containing a hydrogenating metal, and leaching the calcined material with dilute acid.

7. In the process of forming an oxygenated carbon compound of higher molecular weight than carbon monoxide by passing a reactive gas mixture containing carbon monoxide and a substance capable of reacting with said carbon monoxide over a catalyst, the step which comprises using as the catalyst a chromite prepared by calcining at a red heat a hexavalent chromium salt containing a hydrogenating metal.

8. The process of claim 1 in which the chromium salt is a chromate.

9. The process of claim 3 in which the chromium salt is a chromate.

10. The process of claim 4 in which the composition contains a compound of a hydrogenating metal and a compound of an alkali metal salt with hexavalent chromium.

11. The process of claim 4 in which the composition contains a compound of a hydrogenating metal and a compound of an alkali metal salt with hexavalent chromium and in which the calcined residue is leached with dilute acid prior to its use as a catalyst.

12. The process of claim 4 in which the composition contains a compound of an alkali metal salt with hexavalent chromium and an oxide of a hydrogenating metal.

13. In the process of carrying out an organic catalytic hydrogenation reaction by passing a reactive gas mixture at elevated temperature and pressure over a catalyst, the step which comprises using as the catalyst zinc chromite prepared by calcining at a red heat a hexavalent chromium salt containing zinc.

14. The process of claim 13 in which the chromium salt is a chromate of zinc.

15. The process of claim 5 in which the calcination is carried out at a temperature above 650° C.

16. The process of claim 1 in which the calcination is carried out at a temperature above 650° C.

17. The process of claim 2 in which the calcination is carried out at a temperature above 650° C.

18. The process of claim 3 in which the calcination is carried out at a temperature above 650° C.

19. In the process of catalytically synthesizing methanol by passing a mixture of carbon monoxide with hydrogen at elevated temperature and pressure over a zinc chromite catalyst, the step which comprises using as the catalyst a zinc chromite prepared by calcining zinc chromate at a temperature above 650° C.

20. The process of claim 19 in which the calcined product is leached with dilute acid prior to its use as a catalyst.

In testimony whereof I affix my signature.

WILBUR A. LAZIER.